Figure 1:
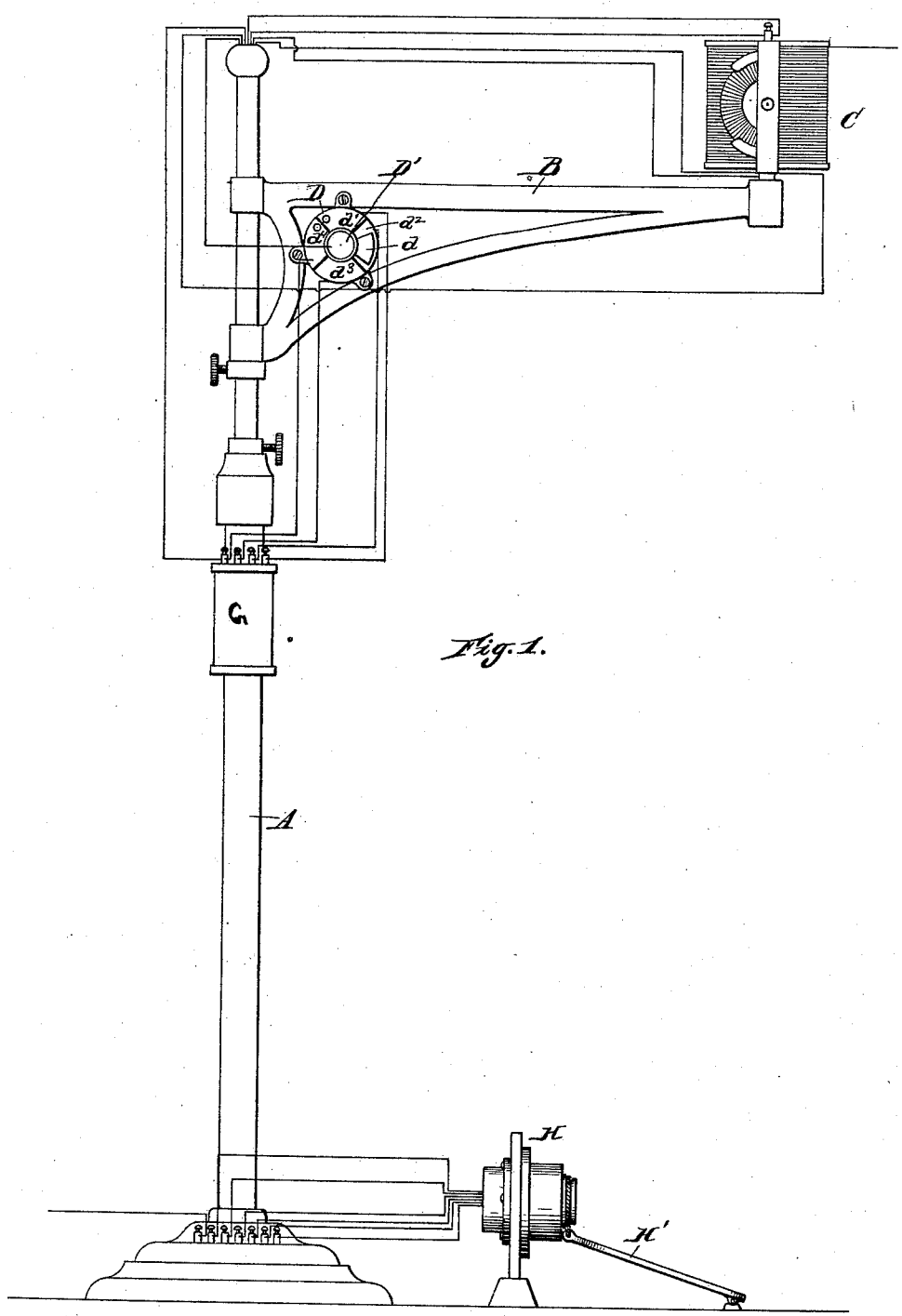

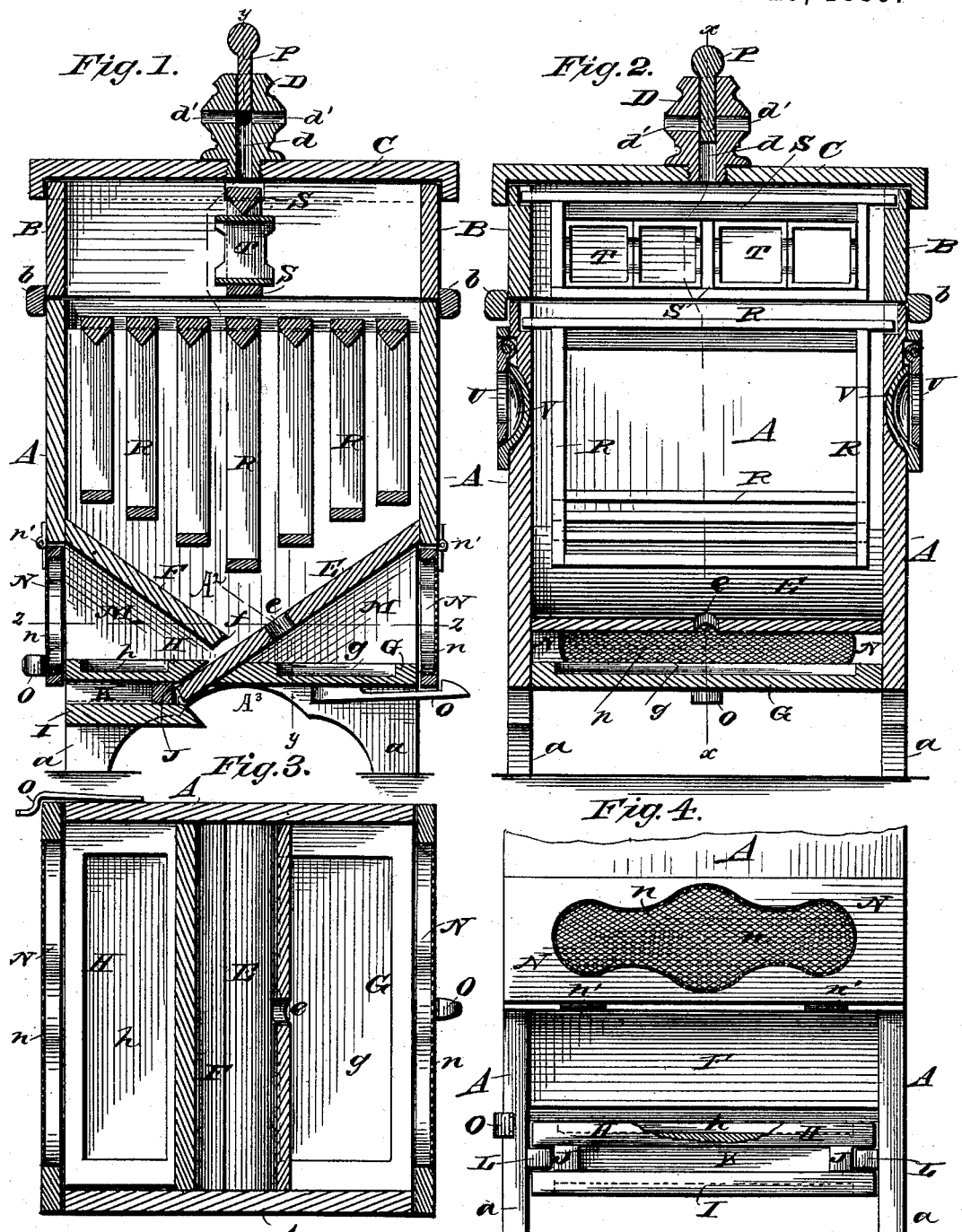

(No Model.) 2 Sheets—Sheet 1.
H. H. BLADES.
DEVICE FOR CONTROLLING ELECTRIC MOTORS.

No. 396,725. Patented Jan. 29, 1889.

WITNESSES
John E. Wiles
M. B. O'Dogherty

INVENTOR,
Harry H. Blades
By C. W. Leggett,
Attorney.